United States Patent
Ahn et al.

(10) Patent No.: US 9,715,758 B2
(45) Date of Patent: Jul. 25, 2017

(54) IMAGE PROCESSING APPARATUS AND METHOD USING VIRTUAL POINT LIGHT (VPL) INFORMATION

(71) Applicant: SAMSUNG ELECTRONICS CO., LTD., Suwon-si (KR)

(72) Inventors: Min Su Ahn, Seoul (KR); In Woo Ha, Yongin-si (KR); Hyong Euk Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 374 days.

(21) Appl. No.: 14/325,684

(22) Filed: Jul. 8, 2014

(65) Prior Publication Data
US 2015/0022524 A1    Jan. 22, 2015

(30) Foreign Application Priority Data

Jul. 16, 2013 (KR) .................. 10-2013-0083682
Oct. 18, 2013 (KR) .................. 10-2013-0124510

(51) Int. Cl.
*G06T 15/50* (2011.01)
*G06T 15/55* (2011.01)

(52) U.S. Cl.
CPC ............ *G06T 15/50* (2013.01); *G06T 15/55* (2013.01)

(58) Field of Classification Search
None
See application file for complete search history.

(56) References Cited

U.S. PATENT DOCUMENTS

| | | | |
|---|---|---|---|
| 6,246,418 B1 | 6/2001 | Oka | |
| 6,753,859 B1 | 6/2004 | Segal | |
| 7,663,623 B2 | 2/2010 | Zhou et al. | |
| 8,451,270 B2 | 5/2013 | Boulton | |
| 2003/0137511 A1* | 7/2003 | Aruga | G06T 15/80 345/426 |
| 2011/0032256 A1 | 2/2011 | Ha | |
| 2011/0069068 A1* | 3/2011 | Ha | G06T 15/60 345/426 |

FOREIGN PATENT DOCUMENTS

| | | |
|---|---|---|
| EP | 2 557 541 A2 | 3/2013 |
| KR | 10-2010-00053413 A | 5/2010 |
| KR | 10-2012-0007398 A | 1/2012 |

OTHER PUBLICATIONS

Laine, Samuli, et al. "Incremental instant radiosity for real-time indirect illumination." Proceedings of the 18th Eurographics conference on Rendering Techniques. Eurographics Association, 2007.*

(Continued)

*Primary Examiner* — Mark Zimmerman
*Assistant Examiner* — Vu Nguyen
(74) *Attorney, Agent, or Firm* — NSIP Law

(57) ABSTRACT

A sampler of an image processing apparatus may sample at least one first virtual point light (VPL) from a direct light view. The sampler may sample a second VPL in a three-dimensional (3D) space independent of the direct light view. A calculator may calculate a luminance of the second VPL using a first VPL adjacent to the second VPL selected from among the at least one first VPL.

26 Claims, 12 Drawing Sheets

(56) References Cited

OTHER PUBLICATIONS

Extended European Search Report issued on Dec. 16, 2015 in counterpart European Patent Application No. 14176951.3 (7 pages, in English).
T. Ritschel et al., "Imperfect Shadow Maps for Efficient Computation of Indirect Illumination", University College London, Universität Stuttgart.
Carsten Dachsbacher et al., "Splatting Indirect Illumination", University of Erlangen-Nuremberg, pp. 93-100, p. 226.
Carsten Dachsbacher et al, "Reflective Shadow Maps", University of Erlangen-Nuremberg, pp. 203-208, p. 231.
Alexander Keller, "Instant Radiosity", Universität Kaiserslautern.
Tobias Ritschel et al., "Making Imperfect Shadow Maps View-Adaptive: High Quality Global Illumination in Large Dynamic Scenes", MPI Informatik, Telecom Paris/Tech/CNRS-LTCI, Samsung Advanced Institute of Technology.
Greg Nichols, "Multiresolution Splatting for Indirect Illumination", University of Iowa.
Philipp Lensing et al., "Efficient Shading of Indirect Illumination Apply Reflective Shadow Maps", Ilmenau University of Technology, pp. 95-95-102.

\* cited by examiner

900

1000

1100

IMAGE PROCESSING APPARATUS AND METHOD USING VIRTUAL POINT LIGHT (VPL) INFORMATION

CROSS-REFERENCE TO RELATED APPLICATIONS

This application claims the priority benefit of Korean Patent Applications No. 10-2013-0083682 filed on Jul. 16, 2013, and No. 10-2013-0124510 filed on Oct. 18, 2013, in the Korean Intellectual Property Office, the disclosures of which are incorporated herein by reference.

BACKGROUND

1. Field

One or more example embodiments of the following description relate to global illumination-based rendering with respect to a three-dimensional (3D) model, and more particularly, to a method of sampling a virtual point light (VPL) on a 3D space for rendering a 3D space by reflecting indirect illumination such as a radiosity method.

2. Description of the Related Art

In various fields including three-dimensional (3D) games, virtual reality (VR) animations, movies, and the like, there is an increased interest in real time rendering with respect to a 3D model. Among 3D rendering technologies, a radiosity method using global illumination considers not only direct illumination by a direct light source included in the 3D model but also indirect illumination by diffused reflection or a reflected light caused by reflection of the direct illumination by an object, thereby increasing rendering quality. In this case virtual point light (VPL) sampling is necessary, which is for properly arranging VPLs representing an indirect illumination effect in predetermined positions in the 3D model.

SUMMARY

The foregoing and/or other aspects are achieved by providing an image processing apparatus including a sampler to sample at least one first virtual point light (VPL) from a direct light view and sample a second VPL on a three-dimensional (3D) space independent of the direct light view, and a calculator to calculate a luminance of the second VPL using first VPL adjacent to the second VPL among the at least one first VPL.

The image processing apparatus may further include a divider to generate a plurality of cells by clustering the 3D space. In this case, the sampler may sample the second VPL on a first cell among the plurality of cells.

The sampler may determine a position of the second VPL by obtaining a weighted average of a position of at least one vertex included in the first cell.

The sampler may determine a normal of the second VPL by obtaining a weighted average of a normal of at least one vertex included in the first cell.

The calculator may determine a color of the second VPL by obtaining a weighted average of a color of at least one vertex included in the first cell.

The calculator may search for at least one neighboring first VPL located within a threshold distance from the second VPL, from among the at least one first VPL, by referencing a hierarchical structure of the plurality of cells, and calculate a luminance of the second VPL by obtaining a weighted average of luminance of the at least one neighboring first VPL.

The divider may generate the plurality of cells by recursively dividing the 3D space. The recursive division repeatedly divides an individual cell generated by previous division until the individual cell meets a predetermined division ending condition.

The divider may additionally divide the individual cell when a volume of the individual cell is greater than or equal to a threshold volume.

The divider may additionally divide the individual cell when a number of vertices included in the individual cell is greater than or equal to a threshold value.

The divider may additionally divide the individual cell when a maximum characteristic value and a minimum characteristic value of the vertices included in the individual cell is greater than or equal to a threshold difference.

The characteristic value may include at least one of a position coordinates, a normal, and a color.

The division ending condition may be met when all vertices of the individual cell are in a visible region from a position of the direct light.

The division ending condition may be met when a VPL having a threshold density is already sampled in the individual cell.

The division ending condition may be adaptively set according to at least one of an operation resource performance and a demanded rendering quality of the image processing apparatus. For example, when the operation resources of the image processing apparatus are ample or when a demanded rendering quality is high, the division ending condition may be set more strictly so that more VPLs are sampled.

The sampler and the calculator may be included in a central processing unit (CPU) included in the image processing apparatus. The image processing apparatus may further include a graphic processing unit (GPU) that renders the 3D space in a rendering view using the at least one first VPL and the second VPL.

The foregoing and/or other aspects are also achieved by providing an image processing apparatus including a divider to generate a plurality of cells by clustering a 3D space to be rendered, and a sampler to sample at least one first VPL in the 3D space from a direct light view and to sample at least one second VPL in the plurality of cells independent of the direct light view.

The divider may generate the plurality of cells by recursively dividing the 3D space, and the recursive division may repeatedly divide an individual cell generated by previous division until the individual cell meets a predetermined division ending condition.

The divider may additionally divide the individual cell when a volume of the individual cell is greater than or equal to a threshold volume.

The divider may additionally divide the individual cell when a number of vertices included in the individual cell is greater than or equal to a threshold value.

The divider may additionally divide the individual cell when a maximum characteristic value and a minimum characteristic value of the vertices included in the individual cell is greater than or equal to a threshold difference.

The division ending condition may be met when all vertices of the individual cell are in a visible region from a position of the direct light The division ending condition may be met when a VPL having a threshold density is already sampled in the individual cell.

The image processing apparatus may further include a calculator to calculate a luminance of the second VPL by obtaining a weighted average of luminance of at least one neighboring first VPL adjacent to the second VPL from among the at least one first VPL.

The foregoing and/or other aspects are also achieved by providing an image processing apparatus including sampling at least one first VPL from a direct light view and sampling at least one second VPL on a 3D space independent of the direct light view, by a sampler of the image processing apparatus, and calculating a luminance of the second VPL using first VPLs adjacent to the second VPL among the at least one first VPL, by a calculator of the image processing apparatus.

The image processing apparatus may further include generating a plurality of cells by clustering the 3D space by a divider of the image processing apparatus. In this case, the sampling samples the second VPL in a first cell of the plurality of cells.

The calculating may search for at least one neighboring first VPL located within a threshold distance from the second VPL, from among the at least one first VPL, by referencing a hierarchical structure of the plurality of cells, and calculate a luminance of the second VPL by obtaining a weighted average of luminance of the at least one neighboring first VPL.

The foregoing and/or other aspects are also achieved by providing an image processing apparatus including sampling a plurality of VPLs by reflecting characteristics of a 3D space independent of a direct light view, arranging the VPLs on the 3D space, and rendering the 3D space using the VPLs.

The image processing apparatus may further include dividing the 3D space into a plurality of cells by clustering, wherein the plurality of VPLs are sampled in at least a part of the plurality of cells according to characteristics of the 3 space.

The dividing may generate the plurality of cells by recursively dividing the 3D space, and the recursive division may repeatedly divide an individual cell generated by previous division until the individual cell meets a predetermined division ending condition.

The predetermined division ending condition may be met at least one of when all vertices of the individual cell are in a visible region from a position of the direct light and when a VPL having a threshold density is already sampled in the individual cell.

The foregoing and/or other aspects are achieved by providing an image processing method including sampling a first virtual point light (VPL) in a 3D scene based on a position or an emission direction of a direct light illuminating the 3D scene, sampling a second VPL in the 3D scene based on a characteristic of the 3D scene, and calculating, by way of a processor, luminance information of the second VPL.

The foregoing and/or other aspects are achieved by providing an image processing method including sampling a first VPL in the 3D space from a direct light view and sampling a second VPL in the 3D space independent of the direct light view, the sampling being performed by a central processing unit ("CPU"); and rendering the 3D space using the first VPL and the second VPL, the rendering being performed by a graphics processing unit in parallel with the sampling performed by the CPU.

The foregoing and/or other aspects are achieved by providing an image processing apparatus including a central processing unit ("CPU") to sample a first virtual point light (VPL) from a direct light view and to sample a second VPL in a three-dimensional (3D) space independent of the direct light view, a calculator to calculate a luminance of the second VPL using the first VPL, and a graphics processing unit to render the 3D space using the first VPL and the second VPL, the rendering being performed by the GPU in parallel with the sampling performed by the CPU.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
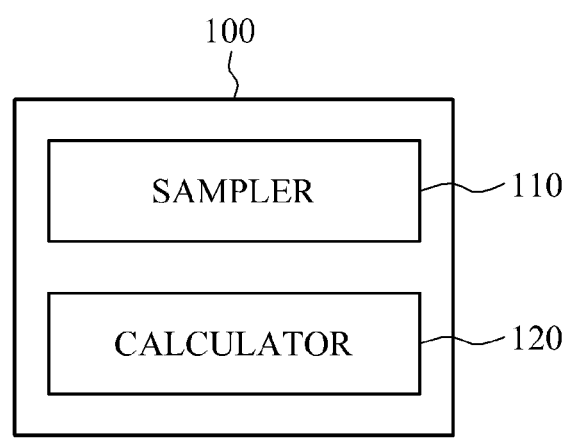
FIG. 1 illustrates an image processing apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1 illustrates an image processing apparatus 100 according to example embodiments. As a non-limiting example, the image processing apparatus 100 may arrange virtual point lights (VPLs) on a three-dimensional (3D) model or a 3D space, the VPLs representing natural phenomena such as reflection, diffraction, and the like of light, to reflect a global illumination effect to rendering according to a radiosity method. Herein, such arranging of the VPLs will be referred to as "sampling." By the VPLs, a change in a color value or a luminance of an object on the 3D model may be reflected to the rendering.

Generally, when the number of sampled VPLs is increased, rendering quality may also be increased but rendering speed may be decreased due to an increased calculation amount. To achieve real time rendering by increasing the rendering speed, a radiosity acceleration method is taken into consideration, which samples VPLs by taking into consideration at least one of a position of direct light and an emission direction of direct light. However, in a 3D object region that the direct light may not reach, rendering quality may not be high enough for a calculation amount required for the VPL processing, or a rendering calculation amount needs to be increased to increase the rendering quality.

The image processing apparatus 100 may include, for example, a sampler 110 and a calculator 120. The sampler 110 may sample at least one first VPL in consideration of at least one of the position and the emission direction of the direct light. Additionally, the sampler 110 may sample at least one second VPL in consideration of characteristics of a 3D model or 3D scene, independent of the position or the emission direction of the direct light. The sampling of the first VPL may refer to a result of sampling a VPL on the 3D scene in consideration of at least one of the position and the emission direction of the direct light, that is, in a same manner as a conventional method. For example, the sampler 110 may generate a two-dimensional (2D) image using at least one of depth information, normal information, and position information of when the 3D space is viewed in the emission direction of the direct light from a position of a direct light view. Also, the sampler 110 may sample the first VPL on the 3D image according to the conventional method. Thus a sampled first VPL may be defined as a VPL having a 3D position using at least one of the depth information, the normal information, and the position information.

The sampler 110 may sample the second VPL in the 3D space in consideration of the 3D space characteristics. The second VPL may be sampled according to following example embodiments, in consideration of complexity of the 3D scene regardless of visibility according to the position or the emitted light of the direct light. That is, in addition to the sampling in consideration of the position and the emission direction of the light, the sampler 110 may separately perform sampling of the second VPL independently from the direct light, thereby achieving real time rendering of a realistic image. Since the second VPL is not sampled from the direct light, luminance information of the second VPL may not be calculated directly using the direct light.

The calculator 120 may detect first VPLs located adjacent to the second VPL and obtain a weighted average of luminance of the detected first VPLs, thereby calculating the luminance of the second VPL. For example, the calculator 120 may detect a neighboring first VPL located within a threshold distance from the second VPL, from among the first VPLs sampled in consideration of the direct light. Also, the calculator 120 may obtain a weighted average of the luminance of the neighboring first VPL and thereby calculate the luminance of the second VPL. For example, the luminance of the second VPL may be calculated using Equation 1.

$$I_{VPL\_Scene} = \sum_{i=1}^{n} (w(i) * I_{VPL\_DL(i)})$$ [Equation 1]

In Equation 1, $I_{VPL\_Scene}$ scene denotes a luminance value of one particular second VPL sampled in consideration of the 3D scene, independently from the direct light. $I_{VPL\_DL(i)}$ denotes a luminance value of an i-th first VPL adjacent to the second VPL. w(i) denotes a weight indicating contribution of the luminance of the first VPL with respect to the luminance of the second VPL. The weight may be increased as a distance to the first VPL is shorter and as a normal direction of the first VPL corresponds more to a position difference vector between the first VPL and the second VPL and the influence increases. The luminance of the second VPL may be calculated by obtaining the weighted average of luminance of an n-number of adjacent first VPLs around the second VPL as shown in Equation 1. The process of generating the second VPL and calculating the luminance of the second VPL will be described in further detail with reference to FIGS. 2 to 4.

Thus, the sampler 110 samples the first VPL in consideration of the direct light and samples the second VPL in consideration of a characteristic of the 3D scene, and the calculator 120 provides luminance information of the second VPL. Therefore, the first VPL and the second VPL may each be used for rendering as VPLs for generating an indirect illumination effect. Once the first VPL and the second VPL are all sampled, rendering may be performed, for example according to the radiosity method, by taking into consideration the first VPL and the second VPL as VPLs in the same manner as the conventional rendering process.

The sampler 110 and the calculator 120 may be implemented by physical or logical operation resources included in a central processing unit (CPU) included in the image processing apparatus 100. After the sampling of the first VPL and the second VPL is completed, the rendering of an image viewing the 3D model from a rendering view using the VPLs may be processed in a parallel manner by a graphic processing unit (GPU), distinguished from the CPU. Consequently, the VPL sampling and the image rendering may be accelerated by the parallel processing of the CPU and the GPU. In comparison to a conventional art that generates the VPL only based on the GPU, the parallel processing may greatly increase the operation speed and therefore may be appropriate for real time rendering. In addition, since the direct light, for example the VPL, is generated adaptively to the 3D scene, the parallel processing may be applied to various contents, that is, various 3D models. Also, scalable rendering according to hardware function may be enabled.

Figure 2:
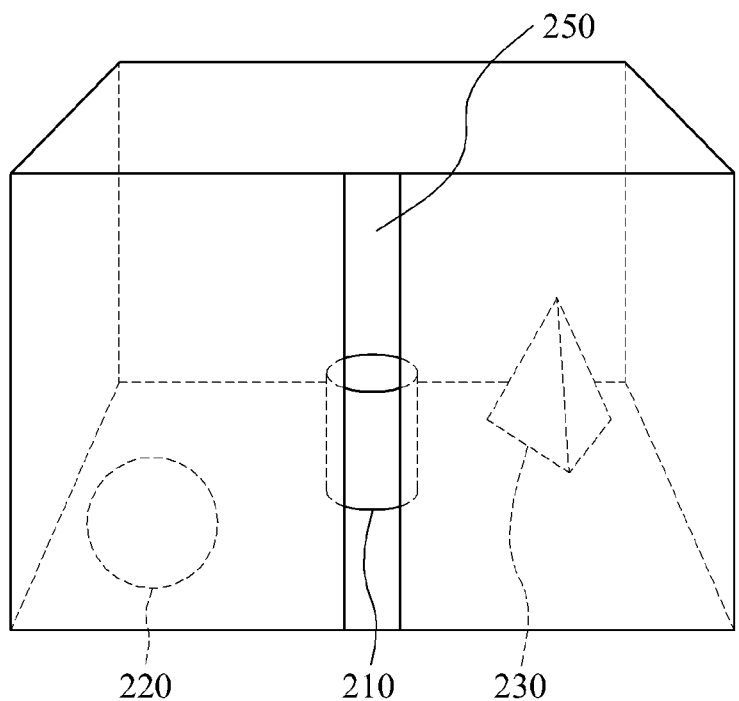
FIG. 2 illustrates a three-dimensional (3D) model in which an image processing apparatus according to example embodiments samples a virtual point light (VPL)

FIG. 2 illustrates a 3D model 200 in which an image processing apparatus according to example embodiments samples a VPL. The 3D model is in the form of a hexahedral room including objects 210, 220, and 230. A gap 250 is formed on one side wall of the hexahedral room. It will be presumed that direct light located at an outside of the room illuminates an inside of the room by way of gap 250 and the room does not include any direct light at the inside.

Figure 3:
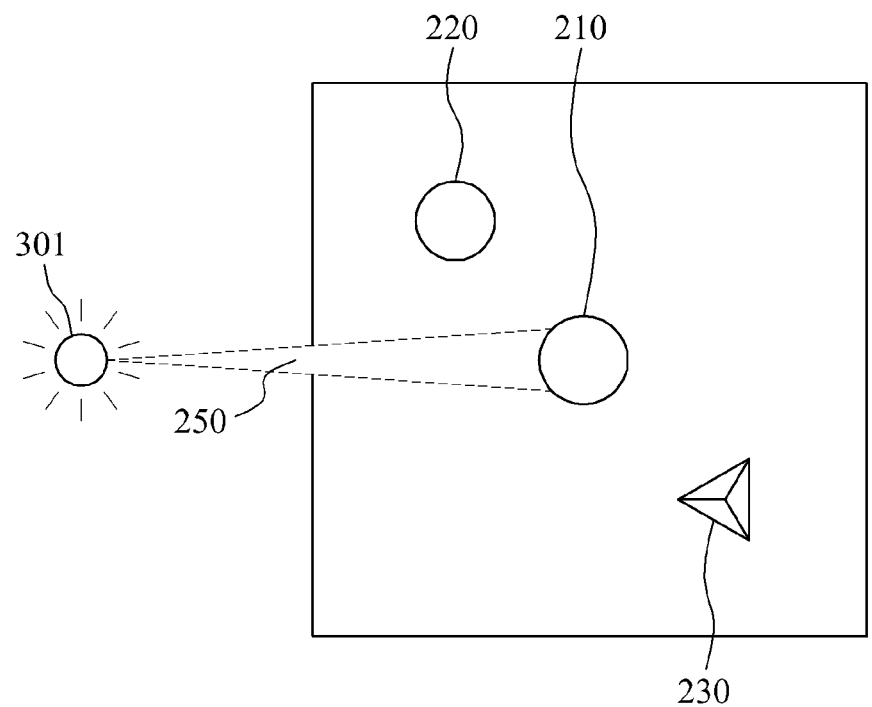
FIG. 3 illustrates a plan view of the 3D model of FIG. 2 and direct light.

FIG. 3 illustrates a plan view of the 3D model of FIG. 2 and direct light 301. The direct light 301 may be located at the outside of the hexahedral room and emits light toward the inside of the room. When only an effect of the direct light 301 is considered, the light may be reflected or diffracted by the object 210 and a floor, ceiling, or walls of the room, the indirect illumination effect of illuminating other areas, for example the objects 220 and 230, may not be expressed. Therefore, the VPLs may be sampled to express the indirect illumination effect such as soft shadow.

The VPL sampling process according to example embodiments will be described with reference to FIG. 4.

Figure 4:
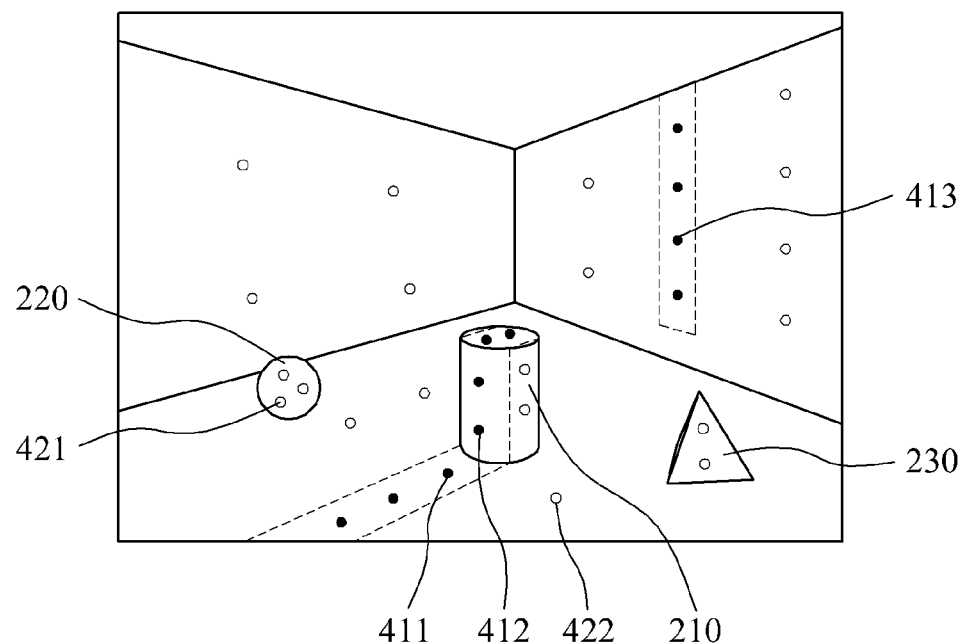
FIG. 4 illustrates a process of sampling a VPL by an image processing apparatus according to example embodiments.

FIG. 4 illustrates a process of sampling a VPL by an image processing apparatus according to example embodiments. The sampler 110 may sample first VPLs 411, 412, and 413, which are sampled in consideration of at least one of a position and an emission direction of the direct light 301 of FIG. 3. In FIG. 4, the first VPLs 411, 412, and 413 are expressed by black points. In the same manner as the conventional method, the first VPLs 411, 412, and 413 may be understood as a result of sampling VPLs on a 3D scene in consideration of at least one of the position and the emission direction of the direct light.

In addition to the sampling of the first VPLs, sampler 110 may sample second VPLs 421 and 422 in the 3D space in consideration of characteristics of the 3D space such as a geometric complexity of positions of the 3D space, and texture complexity of the 3D space, such as a color. The second VPLs 421 and 422 are expressed by white points. As mentioned previously, the second VPLs 421 and 422 may be sampled in consideration of a complexity of the 3D scene irrespective of visibility according to the position and the emission direction of the direct light 301.

For example, in a portion where the geometric complexity, such as a number of vertices present in a unit volume and an inconsistency of the normal of the vertices, is relatively high, a relatively larger number of second VPLs may be sampled. Such a method is reasonable since the portion having the high geometric complexity may affect subjective quality of the rendering result. Also, in a portion where the texture complexity such as the color information is relatively high, a relatively larger number of second VPLs may be sampled. As in the case of the geometric complexity, when the portion having a higher color complexity is more accurately expressed, the rendering quality may be increased. An example of a portion having a relatively high color complexity is a portion having a relatively large variety of different colors within a unit volume.

Since the sampled second VPLs, such as the second VPL 422, are not sampled based on the direct light, luminance information may not be directly provided. A position of the second VPL 422 may be obtained through a weighted average of positions of vertices adjacent to a sampling point. A normal of the second VPL 422 may be reasonably calculated through a weighted average of normals of the adjacent vertices. Furthermore, a color of the second VPL 422 may also be calculated through a weighted average of the color information of the adjacent vertices. However, since the adjacent vertices may not have luminance values, a luminance value of the second VPL 422 may be obtained with a different method described below.

For example, the calculator 120 may use luminance values of the first VPLs 411 and 412 present within a predetermined distance from the second VPL 422 and Equation 1, to calculate the luminance value of the second VPL 422. The first VPLs considered to calculate the luminance value of the second VPL 422 may be the first VPLs present within the predetermined distance from the second VPL 422. However, this is only an example. For example, alternatively, a number (n) of first VPLs may be selected from among all first VPLs in an increasing order of distance from the second VPL 422, and reflected to the luminance value of the second VPL 422. That is, a first VPL that is closest to the second VPL 422 may be selected first to calculate the luminance value, followed by a first VPL that is second-closest to the second VPL 422, followed by a first VPL that is third-closest to the second VPL 422 and so on.

Also, to calculate the color value of the second VPL 422, the calculator 120 may search for the first VPLs 411 and 412 present within the predetermined distance from the second VPL 422 among the all first VPLs, or may select the number n of first VPLs from among all of the first VPLs in the increasing order of distance from the second VPL 422 and use Equation 1 in which the luminance value is substituted by the color value. That is, a first VPL that is closest to the second VPL 422 may be selected first to calculate the color value, followed by a first VPL that is second-closest to the second VPL 422, followed by a first VPL that is third-closest to the second VPL 422 and so on.

As mentioned previously with reference to FIGS. 1 through 4, the process of sampling the second VPLs in consideration of the complexity of the 3D scene may be more systematically performed through spatial division with respect to the 3D space. The process will be described with reference to FIGS. 5 to 8.

Figure 5:
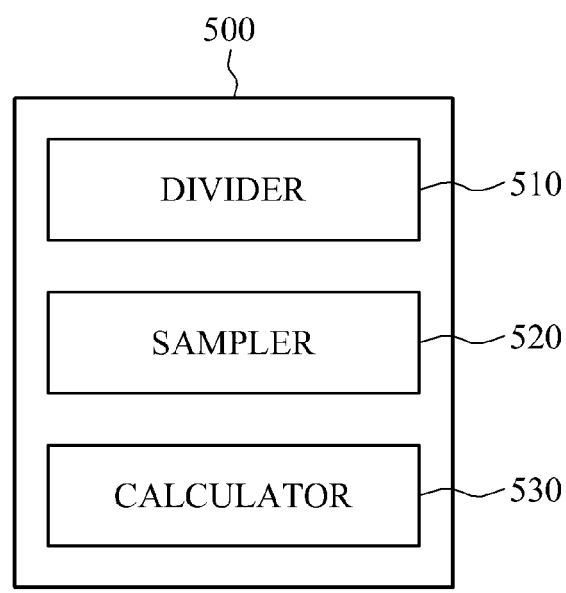
FIG. 5 illustrates an image processing apparatus according to other example embodiments.

FIG. 5 illustrates an image processing apparatus 500 according to other example embodiments. In comparison to the image processing apparatus 100 of FIG. 1, the image processing apparatus 500 may additionally include a divider 510. The divider 510 may divide the 3D space into a plurality of cells by clustering the 3D space, to more systematically consider the complexity of the 3D scene during sampling of the second VPLs. In an embodiment, each of the plurality of cells is comprised of a 3D volume such as a polyhedron, a hexahedron, or a cube.

The divider 510 may recursively or iteratively divide the 3D space, thereby generating a plurality of cells. The spatial division and cell generation may be repeatedly performed until all individual cells already generated by a previous dividing step during the repeated cell division meet a predetermined division ending condition. The divider 510 may divide an entire space including the 3D model into sub cells and then divide the sub cells again, thereby generating the cells. A process of dividing a parent cell into children cells may include various types, for example, 2 division, 4 division, 8 division, and so forth. When dividing one parent cell into a plurality of children cells, the children cells may have equal volumes or the children cells may each include a same number of vertices. Alternatively, when dividing a parent cell into a plurality of children cells, the children cells may have unequal volumes or the children cells may each include a different number of vertices. Therefore, the cell division may not be limited to any particular example embodiments.

A cell division condition and the division ending condition will be further explained.

In an example case of dividing the entire space, when a parent cell has a predetermined threshold volume or more, the divider 510 may divide the parent cell into a plurality of children cells. That is, the cell division condition in this embodiment is that the volume of the parent cell is greater than or equal to the threshold volume.

As another example, when the number of vertices included in one parent cell exceeds a predetermined threshold value, the parent cell may be divided into the plurality of children cells. That is, the cell division condition in this embodiment is that the parent cell includes at least the predetermined threshold number of vertices.

As another example, the divider 510 may divide the parent cell when a difference between a maximum characteristic value and a minimum characteristic value of the vertices of the parent cell is greater than or equal to a threshold difference. In this case, the characteristic value may include at least one of a position coordinate, a normal direction, and a color. In detail, when the difference between a maximum value and a minimum value of coordinates of the vertices of the parent cell is greater than or equal to the threshold difference, the parent cell may be considered to need the cell division due to high spatial distribution of the vertices. The coordinates may refer to a value related to any of an X, Y, and Z axis, or a distance between a vertex and a coordinate origin. In addition, the cell division may be performed when a normal difference or a color difference among the vertices of the parent cell is greater than or equal to the threshold difference. The threshold difference with respect to the coordinate value, the normal, and the color may be set to different values having different dimensions. That is, the cell division condition in the present embodiment is that the difference between a maximum characteristic value and a minimum characteristic value of the vertices in the parent cell meets or exceeds a predetermined threshold.

In the aforementioned manner, recursive and iterative cell division is performed with respect to cells meeting the cell division condition. When all the cells meet the division ending condition, the divider 510 ends the cell division.

For example, the division ending condition may be considered to be met when all vertices of each of the plurality of cells generated by division are in a visible region. When all vertices included in one cell are in the visible region in a position of the direct light, sampling of the first VPL in consideration of the direct light may have already been performed with respect to the cell. Therefore, cell division may not be additionally performed.

For example, the division ending condition may be met when a VPL having a predetermined threshold density with respect to the cells generated by division is already sampled. Various embodiments may be applied for setting the threshold density. For example, when one first VPL or second VPL is already sampled in one cell, it may be understood that the VPL of the threshold density or more is sampled. Alternatively, a number of sampled VPLs per unit volume in one cell may be considered.

As another example, the division ending condition may be varied according to hardware or software performance of operation resources of the VPL. When the operation resources are sufficient, the division ending condition may be administrated more strictly so that the cell division is performed to the greatest extent possible given operation resources. As a result, a larger number of the second VPLs may be sampled, thereby improving the rendering result. However, the division ending condition may be flexibly set so long as real time rendering is possible.

For example, the division ending condition may be adaptively set by a user, according to the hardware characteristics, or according to a required quality level, that is, a level of detail (LOD), set by an application performing the rendering. For example, as the required rendering quality is higher, the division ending condition may be more strictly set so that a larger number of the second VPLs are sampled.

When the spatial division is performed by the divider 510, a sampler 520 may sample a predetermined number of the second VPL, for example one second VPL, with respect to each cell. The second VPL may be disposed in a vertex included in a cell. Alternatively, the second VPL may be disposed in the 3D space rather than on a particular vertex. For example, the sampler 520 may determine a position of the second VPL by obtaining a weighted average of positions of vertices included in a first cell, which is a particular cell for sampling of the second VPL. In addition, the sampler 520 may determine the normal of the second VPL by obtaining a weighted average of normals of the vertices of the first cell.

When the second VPLs are sampled in the cells generated by the spatial division, a calculator 530 may calculate at least one of a color value and a luminance value of the second VPLs. The calculator 530 may determine the color of the second VPL by obtaining a weighted average of color values of the vertices included in the first cell. In addition, the calculator 530 may calculate the luminance of the sampled second VPL by obtaining a weighted average of luminance values of the first VPLs adjacent to the second VPL. This is already described with reference to FIGS. 1 to 4 and Equation 1.

Cell division information may be referenced during the space division to quickly search the first VPLs adjacent to the second VPL. The cell division information may be hierarchical structure information of the cells stored and administrated during the space division. According to the hierarchical structure, cells adjacent to one cell may be quickly detected. Therefore, an adjacent first VPL may be quickly found by checking presence of a first VPL included in the adjacent cells.

The operation of the divider 510, the sampler 520, and the calculator 530 has been described with reference to FIG. 5. When no conflict is caused with the description of the divider 510, the operation of the sampler 520 and the calculator 530 may directly refer to the description of the sampler 110 and the calculator 120 of FIG. 1. The divider 510, the sampler 520, and the calculator 530 may be implemented by physical or logical operation elements included in the CPU of the image processing apparatus 500. The process of generating a rendering image using the generated VPLs, that is, the process of generating a resultant image in consideration of a direct illumination effect and an indirect illumination effect may be performed by a GPU separately provided from the CPU. Accordingly, as aforementioned, the VPL sampling and the image rendering may be accelerated by parallel operations of the CPU and the GPU.

Figure 6:
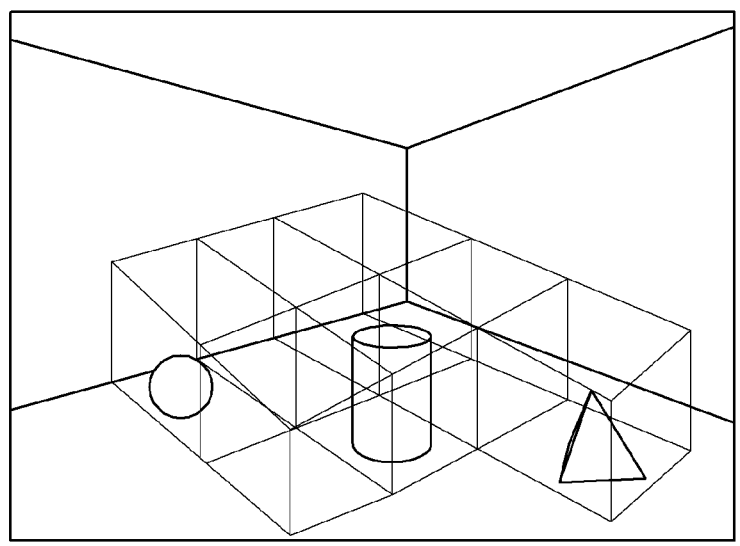
FIG. 6 illustrates a method of dividing a 3D space by a divider according to example embodiments.

FIG. 6 illustrates a method of dividing a 3D space with a divider according to example embodiments. As described with reference to FIG. 5, the divider may generate a plurality of cells by recursively dividing the 3D space. FIG. 6 illustrates the generation process of cells by space division. A process of determining whether to perform additional division with respect to individual cells will be described with reference to FIG. 7.

Figure 7:
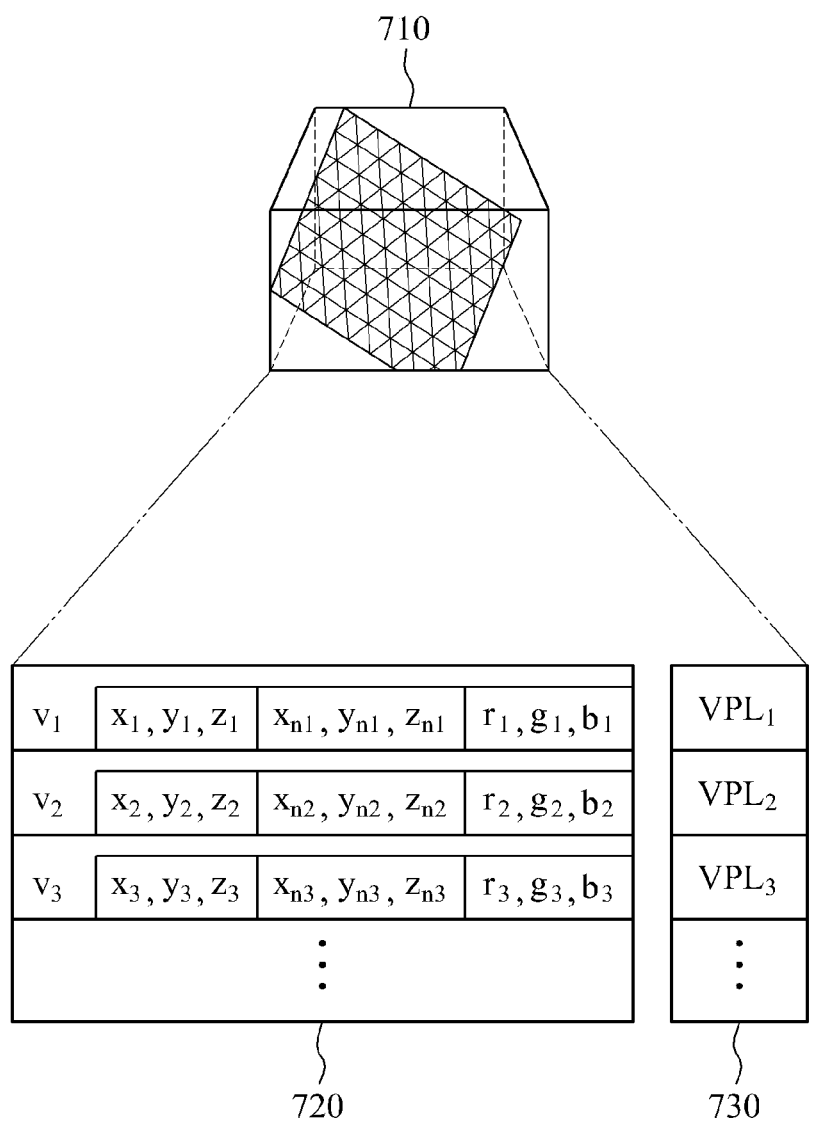
FIG. 7 illustrates a method of determining whether to divide individual cells, according to example embodiments.

FIG. 7 illustrates a method of determining whether to divide individual cells, according to example embodiments. The divider may determine whether to perform additional division with respect to an individual cell 710 or whether to end division without additionally dividing the cell 710. During space division, information 720 storing positions, normals, colors, and the like of vertices V1, V2, V3, and the like included in the cell 710 may be referenced. In addition, information 730 on already sampled VPLs in the cell 710 may be referenced.

The divider may determine whether the cell 710 meets the cell division condition. For example, when a volume of the cell 710 is greater than or equal to a predetermined threshold volume, the divider may additionally divide the cell 710, thereby generating a plurality of children cells from the cell 710. Alternatively, when a number of the vertices V1, V2, V3, and the like of the cell 710 is greater than or equal to a threshold value, the divider may additionally divide the cell 710, thereby generating a plurality of children cells from the cell 710.

As another example, when a difference between a maximum characteristic value and a minimum characteristic value of vertices included in a parent cell is greater than or equal to a threshold difference, the divider may additionally divide the cell 710. For example, when a difference between a maximum value and a minimum value of position coordinates $(x_1, y_1, z_1)$, $(x_2, y_2, z_2)$, $(x_3, y_3, z_3)$, and the like of the vertices, the cell 710 may be additionally divided, thereby generating the plurality of children cells from the cell 710. As previously mentioned, when comparing the maximum value and the minimum value of the position coordinates, coordinate values of any one of the X, Y, and Z-axis may be compared or all values may be compared. Alternatively, normal vectors [$xn_1$, $yn_1$, $zn_1$], [$xn_2$, $yn_2$, $zn_2$], [$xn_3$, $yn_3$, $zn_3$], and the like of the vertices may be compared. When a difference among the normal vectors is greater than or equal to a threshold value, the cell 710 may be additionally divided, thereby generating a plurality of children cells. The difference among the normal vectors may be obtained by comparing inner products of the normal vectors. Also, color values (r, $g_1$, $b_1$), ($r_2$, $g_2$, $b_2$), ($r_3$, $g_3$, $b_3$), and the like of the vertices may be compared and, when a difference in the color values is greater than or equal to a threshold value, the cell 710 may be additionally divided, thereby generating a plurality of children cells. As described above, the threshold difference with respect to the coordinates, the normals, and the colors may be set to different values having different dimensions.

When a division ending condition with respect to the cell 710 is met, the divider may not divide the cell 710 anymore. For example, the division ending condition may be considered to be met with respect to the cell 710 when all vertices V1, V2, V3, and the like of the cell 710 are in a visible region from the position of the direct light. Alternatively, the division ending condition may be considered to be met when VPLs having a predetermined threshold density or a predetermined threshold number of VPLs, such as a VPL1, a VPL2, a VPL3, and so forth, are already sampled with respect to the cell 710.

The cell division condition and division ending condition are previously described in greater detail with reference to FIG. 5.

Figure 8:
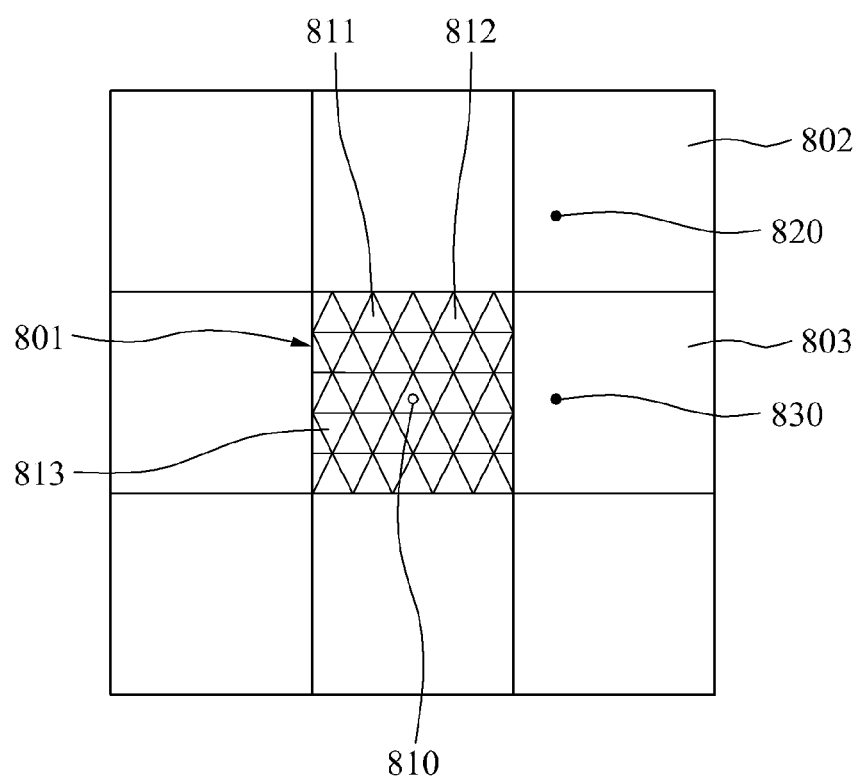
FIG. 8 illustrates a process of sampling a second VPS in a cell and calculating luminance of the second VPL in an image processing apparatus according to example embodiments.

FIG. 8 illustrates a process of sampling a second VPL in a cell and calculating luminance of the second VPL in an image processing apparatus according to example embodiments. A sectional view of nine divided cells is shown as an example. A sampler may sample a predetermined number of, for example one, second VPL 810 in a cell 801. The second VPL 810 may be disposed on vertices included in each cell. The second VPL 810 may be disposed in a 3D space rather than on a particular vertex. For example, the sampler may determine a position of the second VPL 810 by obtaining a weighted average of positions of vertices 811, 812, and 813 included in the cell 801. In addition, the sampler may determine a weighted average of normals of the vertices such as the vertices 811, 812, and 813 of the cell 801 as a normal of the second VPL 810.

When the second VPL 810 is sampled in the cell 801, the calculator may calculate a color and a luminance of the second VPL 810. For example, the calculator may determine the color of the second VPL 810 by obtaining a weighted average of colors of the vertices 811, 812, and 813 of the cell 801. The calculator may calculate the luminance of the second VPL 810 by searching for neighboring cells, for example cells 802 and 803, with reference to a hierarchical structure of spatially divided cells and by obtaining a weighted average of luminance values of first VPLs 820 and 830 in the found cells. The calculation is described above with reference to FIGS. 1 to 4 and Equation 1.

Figure 9:
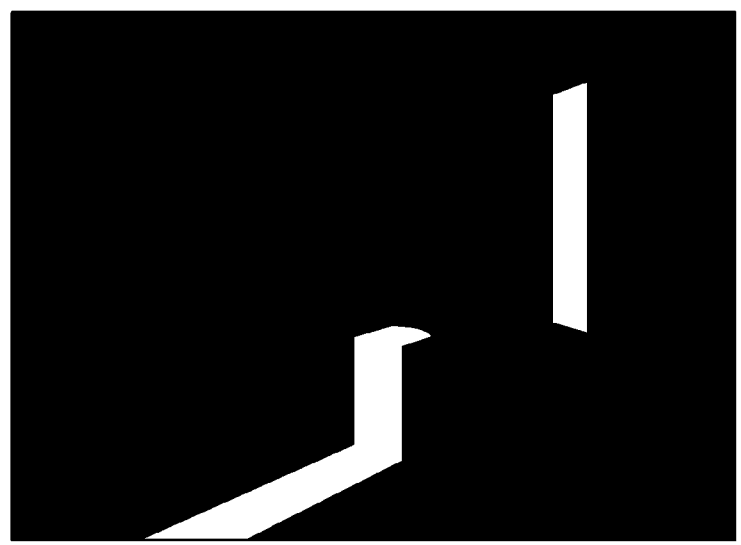
FIG. 9 illustrates a result of rendering reflecting direct light, according to example embodiments.

FIG. 9 illustrates a result of rendering reflecting direct light, according to example embodiments. As described with reference to FIG. 5, rendering of a resultant image may be performed by a GPU (not shown) included in the image processing apparatus 100 or 500. While the first VPLs and the second VPLs are sampled by the divider 510, the sampler 520, and the calculator 530 included in the CPU, the GPU may generate an image 900 reflecting only the direct illumination effect by performing shading in consideration of only the direct light 301 of FIG. 3 in a parallel manner with the CPU.

Figure 10:
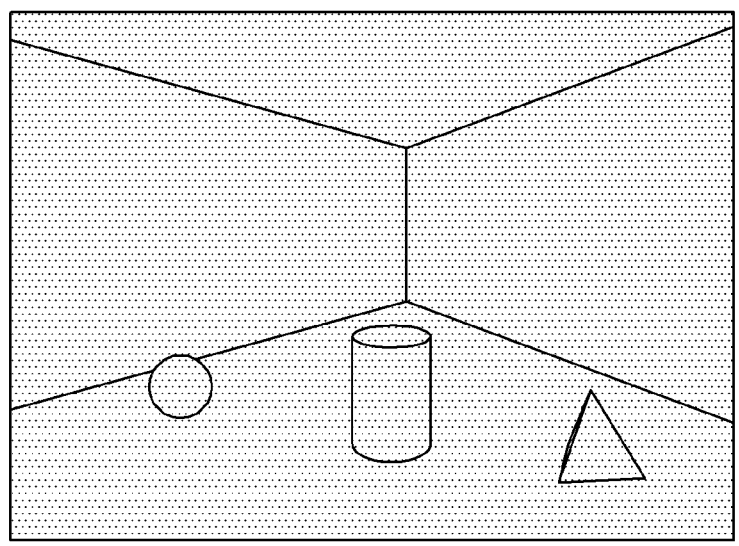
FIG. 10 illustrates a result of rendering reflecting indirect light using VPLs, according to example embodiments.

FIG. 10 illustrates a result of rendering reflecting indirect light using VPLs, according to example embodiments. When the first VPLs and the second VPLs are sampled by the divider 510, the sampler 520, and the calculator 530 included in the CPU, a GPU may generate a resultant image 1000 in consideration of the indirect illumination effect.

In the image 1000, the indirect illumination effect may be expressed by a radiosity method using VPLs. Therefore, a result of similarly rendering physical phenomena such as light reflection and diffraction, for example a soft shadow effect, may be provided.

As previously mentioned, at least a part of the rendering process of the resultant image 900 and the resultant image 1000 may be performed in parallel with the sampling of the VPLs performed by the CPU through space division. Accordingly, the VPL sampling and the image rendering may be accelerated.

Figure 11:
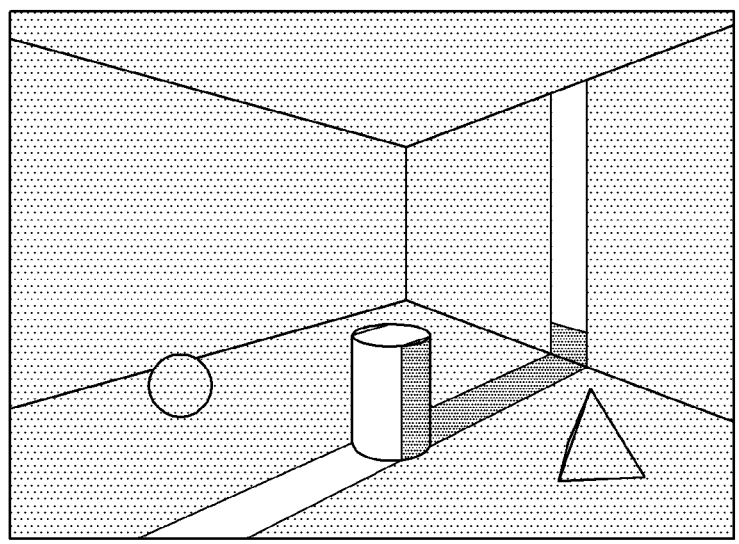
FIG. 11 illustrates a result of rendering reflecting both the rendering result of FIG. 9 and the rendering result of FIG. 10.

FIG. 11 illustrates a result of rendering reflecting both the rendering result of FIG. 9 and the rendering result of FIG. 10. A final rendering image 1100 may be generated by combining the resultant image 900 reflecting only the direct illumination effect and the resultant image 1000 reflecting the indirect illumination effect. According to the foregoing embodiments, rendering quality of the final rendering image 1100 may be greatly increased for the operation resources.

Figure 12:
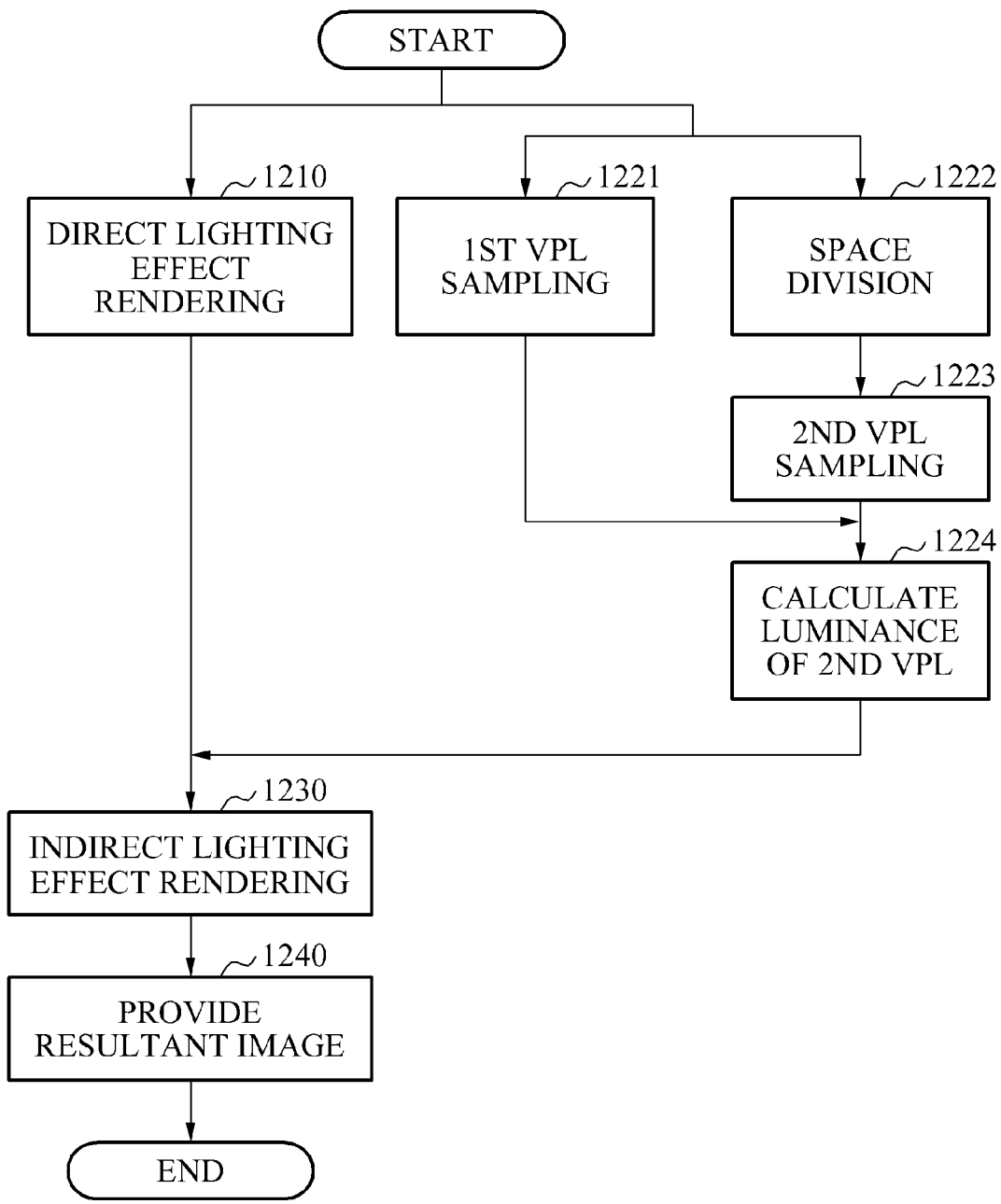
FIG. 12 illustrates an image processing method according to example embodiments.

FIG. 12 illustrates an image processing method according to example embodiments. In operation 1210, as described above with reference to FIG. 9, an image 900 generated in consideration of only the direct illumination effect may be rendered. The rendering may be performed by a GPU. In parallel with the operation 1210, a 3D space may be recursively and iteratively divided in operation 1222 as described with reference to FIG. 5. The space division may be performed in a parallel manner by a CPU. A detailed description about the space division, such as the cell division condition and the division ending condition, may reference the description of FIGS. 5 to 7.

In operation 1221, one or more first VPLs are sampled from a direct light view. The first VPLs may be VPLs of which luminance values may be calculated by the direct light. Further to operation 1222, one or more second VPLs may be sampled with respect to the divided cells in operation 1223. For example, although not limited thereto, one second VPL may be sampled per every divided cell. In this case, a position of the second VPL may be determined through a weighted average of positions of vertices included in a first cell corresponding to the sampled second VPL. A normal of the second VPL may be determined through a weighted average of normals of the vertices included in the first cell.

In operation 1224, a color and a luminance of the second VPL sampled in the first cell may be calculated. For example, a weighted average of colors of the vertices included in the first cell may be determined as the color of the second VPL. The luminance of the second VPL may be calculated through weighted average of luminance values of first VPLs adjacent to the second VPL. Such processes may reference the description with reference to FIGS. 1 to 4, FIG. 8, and Equation 1.

Operations 1221 to 1224 may be performed by the CPU. Since the CPU is appropriate for accelerating operation processing according to a conditional branch, the CPU may accelerate the entire rendering process by operating parallel with the GPU that performs rendering.

In operation 1230, image rendering reflecting the sampled first VPLs and second VPLs may be performed, in the manner as described with reference to FIGS. 5 and 9. In operation 1240, a final rendering image may be provided by combining a rendering result reflecting only the direct illumination effect of operation 1210 and a rendering result reflecting the indirect illumination effect of operation 1230.

Thus, sampling of VPLs may be efficiently performed, thereby increasing global illumination rendering quality with respect to given operation resources. In addition, by the parallel processing of the CPU and the GPU, the VPL sampling and the image rendering may be accelerated and accordingly a possibility of real time rendering may be increased.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the image processing apparatus described herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing apparatus comprising:
   a sampler configured to sample one or more first virtual point lights (VPLs) from a direct light view and to sample a second virtual point light (VPL) in a three-dimensional (3D) space independent of the direct light view;
   a divider configured to generate a plurality of cells by clustering the 3D space, wherein the divider generates the plurality of cells by recursively dividing the 3D space, the recursive dividing comprises repeatedly dividing an individual cell generated by previous division until the individual cell meets a predetermined division ending condition, and the sampler samples the second VPL in a cell selected from among the plurality of cells;
   a calculator configured to calculate a luminance of the second VPL using a VPL adjacent to the second VPL selected from among the one or more first VPLs; and
   a processor configured to perform rendering of the 3D space using the first VPLs and the second VPL.

2. The image processing apparatus of claim 1, wherein the sampler determines a position of the second VPL by obtaining a weighted average of positions of one or more vertices included in the first cell.

3. The image processing apparatus of claim 2, wherein the sampler determines a normal of the second VPL by obtaining a weighted average of normals of one or more vertices included in the first cell.

4. The image processing apparatus of claim 1, wherein the calculator determines a color of the second VPL by obtaining a weighted average of colors of one or more vertices included in the first cell.

5. The image processing apparatus of claim 1, wherein the calculator searches for one or more neighboring first VPLs located within a threshold distance from the second VPL, from among the one or more first VPLs, by referencing a hierarchical structure of the plurality of cells, and calculates a luminance of the second VPL by obtaining a weighted average of a luminance of the one or more neighboring first VPLs.

6. The image processing apparatus of claim 1, wherein the divider additionally divides an individual cell when a volume of the individual cell is determined to be greater than or equal to a threshold volume.

7. The image processing apparatus of claim 1, wherein the divider additionally divides an individual cell when a number of vertices included in the individual cell has been determined to be greater than or equal to a threshold value.

8. The image processing apparatus of claim 1, wherein the divider additionally divides an individual cell when a maximum characteristic value and a minimum characteristic value of the vertices included in the individual cell has been determined to be greater than or equal to a threshold difference.

9. The image processing apparatus of claim 8, wherein the characteristic value comprises any one or any combination of two or more of a position coordinates, a normal, and a color.

10. The image processing apparatus of claim 1, wherein the division ending condition is met when all vertices of the individual cell are in a visible region from a position of the direct light.

11. The image processing apparatus of claim 1, wherein the division ending condition is met when a VPL having a threshold density has already been sampled in the individual cell.

12. The image processing apparatus of claim 1, wherein the division ending condition is adaptively set according to either one or both of an operation resource performance and a demanded rendering quality of the image processing apparatus.

13. The image processing apparatus of claim 1, wherein
    the sampler and the calculator are included in the processor and the processor corresponds to a central processing unit (CPU) included in the image processing apparatus, and
    the image processing apparatus further comprises a graphic processing unit (GPU) that renders the 3D space in a rendering view using the one or more first VPLs and the second VPL.

14. An image processing apparatus comprising:
    a divider configured to generate a plurality of cells by clustering a three-dimensional (3D) space to be rendered, wherein
    the divider generates the plurality of cells by repeatedly dividing the 3D space until a predetermined condition is met;
    a sampler configured to sample one or more first virtual point lights (VPLs) in the 3D space from a direct light view and to sample one or more second VPLs in the plurality of cells independent of the direct light view; and
    a processor configured to perform rendering using the first VPLs and the second VPLs.

15. The image processing apparatus of claim 14, further comprising:
    a calculator configured to calculate a luminance of the second virtual point light (VPL) by obtaining a weighted average of a luminance of one or more neighboring first VPLs adjacent to the second VPL selected from among the one or more first VPLs.

16. An image processing method comprising:
    dividing a three-dimensional (3D) space into a plurality of cells by repeatedly dividing the 3D space until a predetermined condition is met;
    sampling a plurality of virtual point lights (VPLs) by reflecting characteristics of the 3D space independent of a direct light view, wherein the plurality of VPLs are sampled in at least a part of the plurality of cells according to characteristics of the 3D space;
    arranging the VPLs in the 3D space; and
    rendering, using a processor, the 3D space using the VPLs.

17. The image processing method of claim 16, wherein the predetermined condition is met in response to either or both of all vertices of an individual cell being in a visible region from a position of the direct light and a virtual point light (VPL) having a threshold density having already been sampled in the individual cell.

18. A non-transitory computer-readable storage medium storing instructions that, when executed by a processor, cause the processor to perform an image processing method, wherein the image processing method comprises:
    sampling a first virtual point light (VPL) from a direct light view and sampling a second VPL in a three-dimensional (3D) space independent of the direct light view;
    dividing the 3D space into a plurality of cells by repeatedly dividing the 3D space until a predetermined condition is met, wherein the second VPL is sampled in a first cell selected from among the plurality of cells;
    calculating a luminance of the second VPL using a VPL adjacent to the second VPL selected from among the one or more first virtual point lights (VPLs); and
    rendering, using a processor, the 3D space using the VPLs.

19. A non-transitory computer-readable storage medium storing instructions that, when executed by a processor, cause the processor to perform an image processing method, wherein the image processing method comprises:
    dividing a three-dimensional (3D) space into a plurality of cells by repeatedly dividing the 3D space until a predetermined condition is met;
    sampling a plurality of virtual point lights (VPLs) by reflecting characteristics of the 3D space independent of a direct light view, wherein the plurality of VPLs are sampled in at least a part of the plurality of cells according to characteristics of the 3D space;
    arranging the VPLs in the 3D space; and
    rendering the 3D space using the VPLs.

20. An image processing method comprising:
    sampling a first virtual point light (VPL) in a three-dimensional (3D) scene based on a position or an emission direction of a direct light illuminating the 3D scene;
    sampling a second VPL in the 3D scene based on a characteristic of the 3D scene, further comprising generating a plurality of cells by clustering the 3D space, and sampling the second VPL in a first cell selected from among the plurality of cells; and
    calculating luminance information of the second VPL, wherein the luminance information of the second VPL is calculated based on luminance information of the first VPL; and
    rendering, using a processor, the 3D scene using the VPLs.

21. The image processing method of claim 20, wherein the sampling of the second VPL comprises sampling of the second VPL independent of the direct light.

22. The image processing method of claim 20, wherein the characteristic comprises either one or both of a geometric complexity and a texture complexity of the scene.

23. The image processing method of claim 20, wherein the sampling of the second VPL further comprises:
determining a position of the second VPL by obtaining a weighted average of a position of one or more vertices included in the first cell.

24. The image processing method of claim 20, wherein the first VPL comprises a plurality of first VPLs and the luminance information of the second VPL is calculated by:
detecting first VPLs located adjacent to the second VPL from among the plurality of first VPLs; and
obtaining a weighted average of a luminance of the detected first VPLs,
wherein a weight of a particular first VPL in the weighted average is made larger relative to other first VPLs when a distance between the particular first VPL and the second VPL is shorter than a distance between any of the other first VPLs and the second VPL.

25. An image processing method comprising:
sampling a first virtual point light (VPL) in a three-dimensional (3D) space from a direct light view and sampling a second VPL in the 3D space independent of the direct light view, the sampling being performed by a central processing unit ("CPU") and further comprising generating a plurality of cells by clustering the 3D space, and sampling the second VPL in a first cell selected from among the plurality of cells;
calculating a luminance of the second VPL using the first VPL; and
rendering the 3D space using the first VPL and the second VPL, the rendering being performed by a graphics processing unit in parallel with the sampling performed by the CPU.

26. An image processing apparatus comprising:
a central processing unit (CPU) configured to sample a first virtual point light (VPL) from a direct light view and to sample a second VPL in a three-dimensional (3D) space independent of the direct light view and further configured to generate a plurality of cells by clustering the 3D space, and to sample the second VPL in a first cell selected from among the plurality of cells;
a calculator configured to calculate a luminance of the second VPL using the first VPL; and
a graphics processing unit (GPU) configured to render the 3D space using the first VPL and the second VPL, the rendering being performed by the GPU in parallel with the sampling performed by the CPU.

* * * * *